(12) United States Patent
Naseef (10) Patent No.: US 10,355,793 B2
(45) Date of Patent: Jul. 16, 2019

(54) TESTING SYSTEM AND METHOD FOR TESTING

(71) Applicant: Rohde & Schwarz GmbH & Co. KG, München (DE)

(72) Inventor: Mahmud Naseef, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 85 days.

(21) Appl. No.: 15/654,998

(22) Filed: Jul. 20, 2017

(65) Prior Publication Data
US 2019/0028216 A1   Jan. 24, 2019

(51) Int. Cl.
*H04W 4/02* (2018.01)
*H04B 17/345* (2015.01)
*G08G 1/16* (2006.01)
*H04W 84/12* (2009.01)

(52) U.S. Cl.
CPC ........... *H04B 17/345* (2015.01); *G08G 1/161* (2013.01); *H04W 84/12* (2013.01)

(58) Field of Classification Search
CPC .............. G06F 9/5027; G06F 11/0709; G06F 11/0751; G06F 11/079; H04L 2029/06054; H04L 29/06; H04L 29/12066; H04L 47/14; H04L 47/193; H04L 47/24; H04L 61/1511; H04L 63/0272; H04L 63/0428; H04L 63/1408
See application file for complete search history.

(56) References Cited

U.S. PATENT DOCUMENTS

| | | | |
|---|---|---|---|
| 8,537,032 B2 * | 9/2013 | Yamada | G08G 1/096783 340/901 |
| 9,147,353 B1 * | 9/2015 | Slusar | G09B 19/167 |
| 2006/0083250 A1 * | 4/2006 | Jordan | H04L 12/4135 370/400 |
| 2008/0046142 A1 * | 2/2008 | Jordan | H04L 12/40195 701/36 |
| 2009/0219830 A1 * | 9/2009 | Venner | H04L 41/0806 370/254 |

FOREIGN PATENT DOCUMENTS

| | | |
|---|---|---|
| JP | 2006101294 A | 4/2006 |
| JP | 2007189436 A | 7/2007 |

* cited by examiner

*Primary Examiner* — Sai Aung
(74) *Attorney, Agent, or Firm* — Westman, Champlin & Koehler, P.A.

(57) ABSTRACT

The present invention relates to a testing system for measuring and analyzing interferences caused by wireless communication signals generated in vehicles, comprising: a plurality of vehicle devices which are arranged in a test environment in proximity to each other, wherein at least one first vehicle device comprises a transmit device for transmitting wireless test signals; wherein at least one second vehicle device comprises a receive device for receiving the transmitted test signals; at least one multiport analyzer device for analyzing test signals, wherein the analyzer device is connected to at least one of the transmit devices and to at least one of the receive devices; wherein the analyzer device is configured to analyze at least one wireless communication link between the at least one first vehicle device and the at least one second vehicle device under various test conditions based on the transmitted and received test signals.

19 Claims, 6 Drawing Sheets

TESTING SYSTEM AND METHOD FOR TESTING

FIELD OF THE INVENTION

The present invention relates to a testing system for measuring and analyzing interferences caused by wireless communication signals generated in vehicles and to a corresponding method for testing.

TECHNICAL BACKGROUND

The present invention is in the field of vehicle-to-vehicle (V2V) communication which is already existent in particular for automotive safety applications. In the following, the present invention and the problem addressed thereby will specifically be explained on the basis of car-to car (C2C) communication, although this should not be understood as limiting.

JP 2006 101294 A and JP 2007 189436 A disclose examples of such C2C communication systems. The C2C communication systems disclosed in these papers comprise means for elimination or prevention of interference in the transmitted signals.

In the near future, modern vehicles will be equipped with the capability of creating an in-vehicle WLAN hotspot. As such, the complete elimination or prevention of interference between the different interfering WLAN hotspots is a challenging object. The WLAN hotspot frequency of for example 2.4 GHz or 5 GHz at a power level of 14 dBm or 30 dBm, respectively, will have an influence on other WLAN connections of other vehicles in the proximity of this vehicle. Preferably the maximum throughput with the minimum power should be applied. However, as the CA threshold is not directly depending on the transmission power, a reduction of the transmission power is not always and directly beneficial.

SUMMARY OF THE INVENTION

Against this background, the present invention addresses the need of improving the understanding of possible influences of different properties, such as of the vehicle, a WLAN hotspot, of used materials, of communication signals, under various conditions on the interference of a V2V communication.

According to a first aspect, a testing system for measuring and analyzing interferences caused by wireless communication signals generated in vehicles, the system comprising: a plurality of vehicle devices which are arranged in a test environment in proximity to each other, wherein at least one first vehicle device comprises a transmit device for transmitting wireless test signals; wherein at least one second vehicle device comprises a receive device for receiving the transmitted test signals; at least one multiport analyzer device for analyzing test signals, wherein the analyzer device is connected to at least one of the transmit devices and to at least one of the receive devices; wherein the analyzer device is arranged and configured such to analyze at least one wireless communication link between the at least one first vehicle device and the at least one second vehicle device under various test conditions based on the transmitted wireless test signals and the corresponding received test signals.

According to a second aspect, a test method for measuring and analyzing interferences caused by wireless communication signals generated in vehicles, the method comprising: providing a plurality of vehicle devices which are arranged in a test environment in proximity to each other; providing a test signal; transmitting the test signal via a wireless communication link from a first vehicle device; receiving the wirelessly transmitted test signal from at least one second device; analyzing the wireless communication link under various test conditions based on the transmitted wireless test signal and the corresponding received test signals.

The basic idea underlying the present invention is to employ a commonly known multiport analyzer device, such as a multiport spectrum or a vector network analyzer, for the measuring and analyzing of interferences which are caused by wireless communication signals generated in vehicles. This way, it is possible to identify the source of interferences and to optimize the complete scenario.

Another aspect of this invention is the capability of the test system for measuring and analyzing a plurality of received test signals which are resulting from the same transmitted test signal or different test signals at different vehicle devices simultaneously. This way, it is possible to test a complete automotive scenario in terms of interferences caused by their wireless communication.

Advantageous embodiments and developments will become apparent from the additional dependent claims and the description with reference to the figures of the drawings.

In one embodiment, the multiport analyzer device comprises a signal generator for providing and transmitting predetermined wireless test signals to the transmit devices of the first vehicle devices. The test signal may be any kind of test signal, such as a WLAN signal, a radio-based signal, a simple continuous wave signal or the like. The test signal may comprise data which is e.g. frequency and/or amplitude modulated in the test signal. However, it is also possible that the test signal is a simple continuous wave signal without any data modulated or coded in the test signal. Further, the multiport analyzer device comprises a multiport measurement device having a plurality of receive ports for receiving and measuring a plurality of received test signals. It should be understood that it is not compulsory that the multiport analyzer device comprises the signal generator. In particular, the signal generator may also be implemented separately. This is in particular advantageous if only a simple continuous wave signal should be produced.

In a particularly preferred embodiment, the multiport analyzer device is a multiport network analyzer, such as a vector network analyzer (VNA). A network analyzer is an instrument that is capable to measures RF network parameters properties up to the GHz domain. The network analyzer is in particular suitable for path loss measurements in the communication link. Additionally or alternatively, the multiport analyzer device may also be a multiport spectrum analyzer. A spectrum analyzer is in particular suitable for frequency and specifically for WLAN performance measurements of the communication link as this kind of measurement requires a spectral selective analysis of the received test signals. These kinds of analyzer devices have preferably (but not compulsory) up to 16 receive ports for connecting the multiport network analyzer and the multiport spectrum analyzer, respectively, to a corresponding number of 16 receive devices of the second vehicle devices.

According to a typical development, at least two multiport analyzer devices are provided. The at least two analyzer devices are connected and synchronized to each other via a backbone connection or network. Thus, it is possible to extend existing analyzer devices to the needs of the test environment. Especially, it is possible to increase the number of vehicles which are tested within the same test environment of the testing system.

In one embodiment, the test environment is a stationary test environment. Stationary means in this context that the vehicle devices are arranged in a predetermined and fixed, non-mobile configuration to each other. In this configuration, the connections between the multiport analyzer device and the corresponding vehicle devices connected thereto are preferably designed as hardwired connections.

In an alternative embodiment, the test environment is a dynamic test environment. In this dynamic test environment, at least one of the vehicle devices is moving along a predetermined or arbitrary trajectory. With this configuration, it is possible to test the V2V communication properties between different vehicle devices in a real world scenario where at least some of these vehicle devices are moving.

In one further embodiment, at least one of the connections between the multiport analyzer device and the vehicle devices is a wireless connection. This embodiment is in particular advantageous (but not compulsory) for the above mentioned dynamic test environment with moving vehicle devices. For forwarding the received test signals to the multiport analyzer device, an optical transmission, an acoustic transmission, a magnetic transmission or the like may be employed. It is also possible to wirelessly forward the received test signals by using RF signal modulating techniques which employ another frequency spectrum than the test signal.

According to a typical development, the vehicle devices are motor driven vehicles, such as cars, trucks, buses and/or motorcycles.

In an alternative embodiment, the vehicle device is a simulation or faithful reproduction of a motor vehicle. It is also possible that the vehicle device is a simulation or faithful reproduction of a part of the motor vehicle. In particular, it is very often already sufficient to test and measure the impact of the test signal on the car glass, such as the laminated windscreen, the side and rear screens. Since the car body mostly consists of metal, it behaves like a Faraday's cage. As such, the wirelessly transmitted test signals are predominantly transmitted through the car glasses. Due to this finding, a pretty reliable simulation of a part of the motor vehicle is preferably a car glass having predetermined transmission properties for the transmitted test signal.

The analyzer device is preferably configured to test the properties of a specific car glasses, such as the absorption rate, reflexion and/or transmission of different types of car glasses.

Additionally or alternatively, the analyzer device is configured to test the path loss, in particular in a communication link between the first vehicle device and at least one second vehicle device.

In a particularly preferred embodiment, the at least one vehicle device comprises as well a transmit device and a receive device which may preferably be implemented in one and the same instrument. As such, the vehicle device may as well be used as a device under test and as transmitter for transmitting test signals. This makes the testing more efficient and in particular more flexible in particular if for example every vehicle device of the test environment comprises a combined transmit and receive device. In this case, the test environment may be established pretty flexible depending on the actual test needs.

According to a typical development, at least one of the transmit devices and/or at least one of the receive devices is/are arranged within a main or passenger cabin of a corresponding vehicle device or at least within the main body of the corresponding vehicle device.

In a particularly preferred embodiment, the at least one vehicle device comprises a WLAN hotspot. The WLAN hotspot comprises a transmit antenna and a receive antenna for establishing a WLAN communication link to at least one other vehicle devices. The multiport analyzer device is further configured to test and analyze the established WLAN communication link. A hotspot is a physical location where Internet access is possible, typically using WiFi technology, via a wireless local area network (WLAN) using a router connected to an internet service provider. Private WLAN hotspots may be configured on a smart phone or tablet with a mobile network data plans to allow Internet access to a few other WLAN capable devices via WiFi.

In a further preferred embodiment, the WLAN hotspot is part of a WLAN capable infotainment system within the corresponding vehicle device so that existing resources are employed for the WLAN hotspot establishment.

In a particularly preferred embodiment, the multiport analyzer device is configured to test and analyze a communication link for a vehicle-to-vehicle (V2V) communication—or in particular car-to-car (C2C) communication—according to the IEEE 802.11p standard.

Where practical, the above embodiments and developments can be combined in any manner. Other possible embodiments, developments and implementations of the invention include combinations of features described above or below in relation to the embodiments, even if said combinations are not explicitly mentioned. More particularly, a person skilled in the art would also add individual aspects to the basic form of the present invention as improvements or additions.

CONTENTS OF THE DRAWINGS

The present invention will now be explained in more detail below on the basis of the embodiments provided in the schematic figures of the drawings, in which.

The accompanying drawings are intended to provide a better understanding of the embodiments of the invention. They illustrate embodiments and, in combination with the description, explain the principles and concepts behind the invention. Other embodiments and many of the stated advantages will become apparent from the drawings. The elements in the drawings are not necessarily drawn to scale.

In the figures of the drawings, like elements and components or those having the same function or action are in each case provided with the same reference numerals, unless stated otherwise.

DESCRIPTION OF EMBODIMENTS

Figure 1:
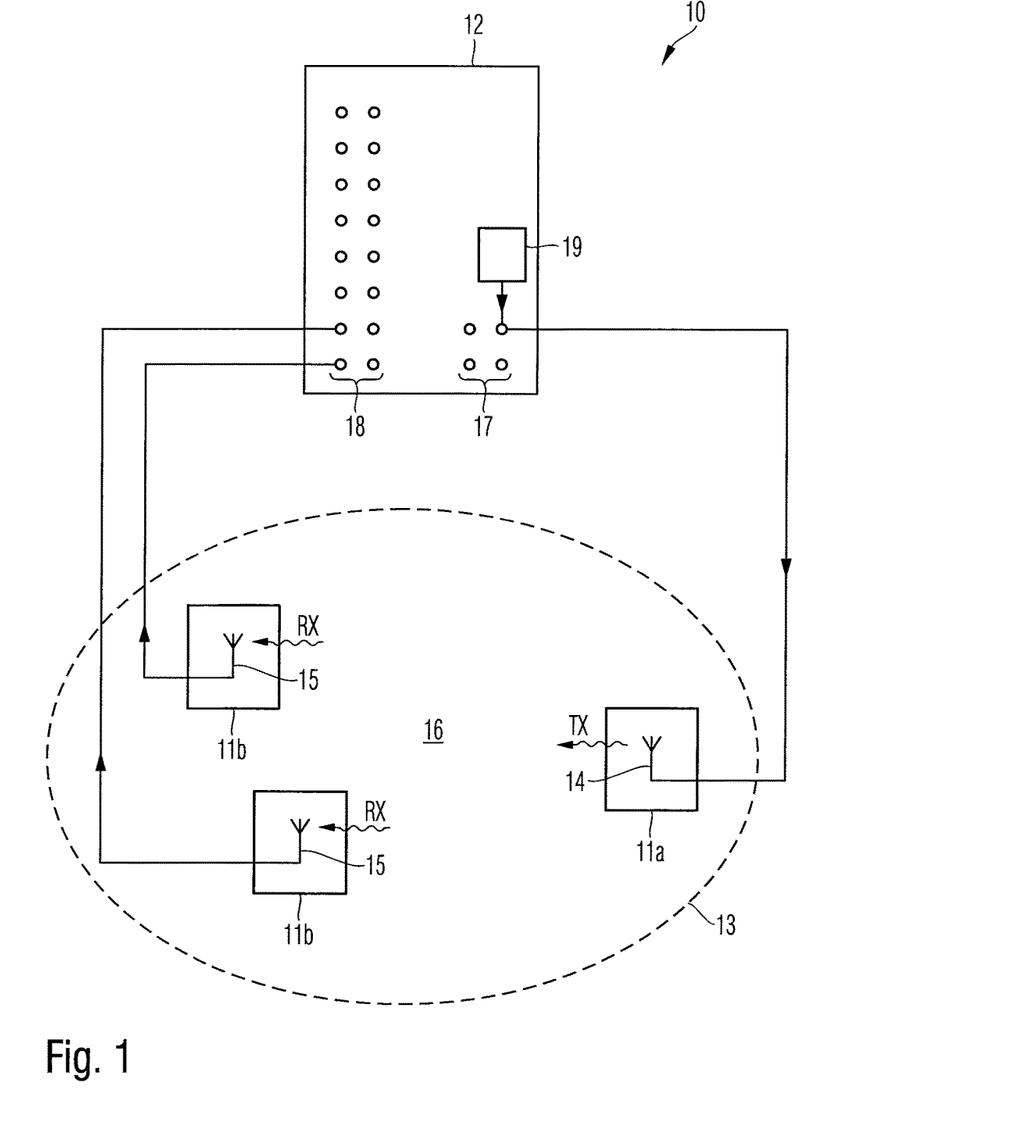
FIG. 1 shows a block diagram of a testing system according to one aspect of the present invention.

FIG. 1 shows a block diagram of a testing system according to one aspect of the present invention. In FIG. 1 the testing system is denoted by reference numeral 10. According to the invention, the testing system 10 is used for measuring and analyzing interferences caused by wireless communication signals generated in vehicles. For this purpose the testing system 10 comprises a plurality of vehicles 11a, 11b and at least one multiport analyzer 12.

The plurality of vehicles 11a, 11b is arranged in a test environment 13 in close proximity to each other in order to simulate a real road scenario.

Figure 2:
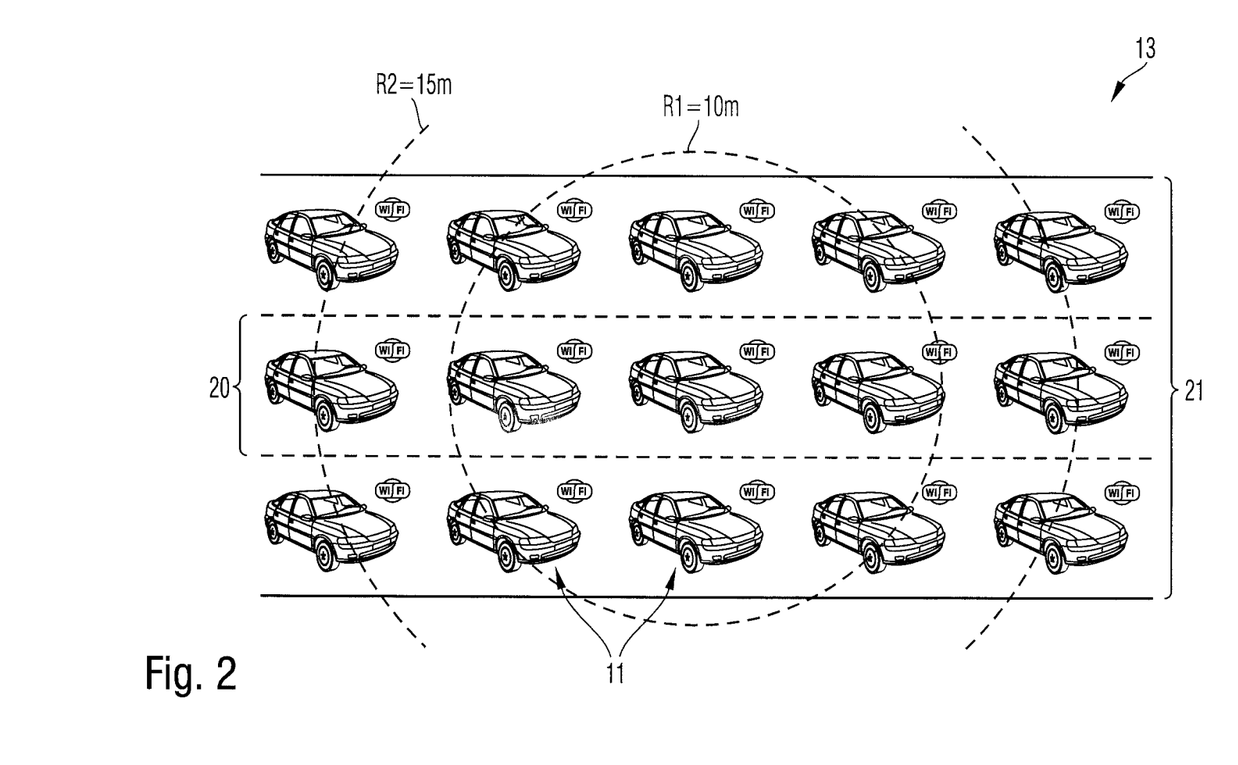
FIG. 2 shows an embodiment of a test environment.

In particular, depending on the measuring capabilities and the needs, one can imagine that the test environment 13 has a different radius R1, R2. In particular, depending on the measuring capabilities and the needs, one can imagine that the test environment 13 has a radius of R1=10 meters or R2=15 meters. With a 10 meter radius it is possible to simulate a real road scenario and thus to provide a test environment 13 with up to 3 vehicles 11 in a one lane road 20 and up to 9 vehicles 11 in a three lane road 21. With a 15 meter radius it is possible to simulate a real road scenario with up to 5 vehicles 11 in a one lane road 20 and up to 15 vehicles 11 in a three lane road 21 (see FIG. 2)

In FIG. 1, at least a first vehicle 11a comprises a transmit device 14 for transmitting wireless test signals TX. At least a second vehicle 11b comprises a receive device 15 for receiving the transmitted test signals RX. The transmit devices 14 and receive devices 15 may be in the form of transmit and receive antennas 14, 15 respectively.

The vehicles 11a, 11b may be any kind of motor vehicles, such as a car, a truck, a bus, a motorcycle or the like. In other embodiments, the vehicles 11a, 11b may also be a reproduction, imitation or simulation of a real motor vehicle. In still other embodiments, it may also be sufficient to use parts of a vehicle or simulations thereof, for example the car glass, for establishing the test environment 13.

The multiport analyzer 12 a is multiport vector network analyzer or a multiport spectrum analyzer. The multiport analyzer 12 is configured for measuring received test signals RX and for analyzing a corresponding communication link 16. For this purpose, the multiport analyzer 12 comprises at least one output or transmit port 17 which is connected to the transmit device 14 and—as its name already implies—a plurality of input or receive ports 18. In particular, the multiport analyzer 12 may comprise 16 input ports 18. Each of the input ports 18 is connected to one receive device 15 within a vehicle 11b.

The multiport analyzer 12 further comprises a signal generator 19. The signal generator 19 is capable of generating a test signal TX which is provided via the output ports 17 to the transmit device 14. This test signal TX is then transmitted via the wireless communication link 16 to at least one of the receive devices 15. The received test signal RX is then forward via the receive devices 15 back to the analyzer 12.

The analyzer 12 is arranged and configured within the testing system 10 such to test and analyze the wireless communication link 16 under various test conditions and based on the transmitted wireless test signals TX and the corresponding received test signals RX.

Figure 3:
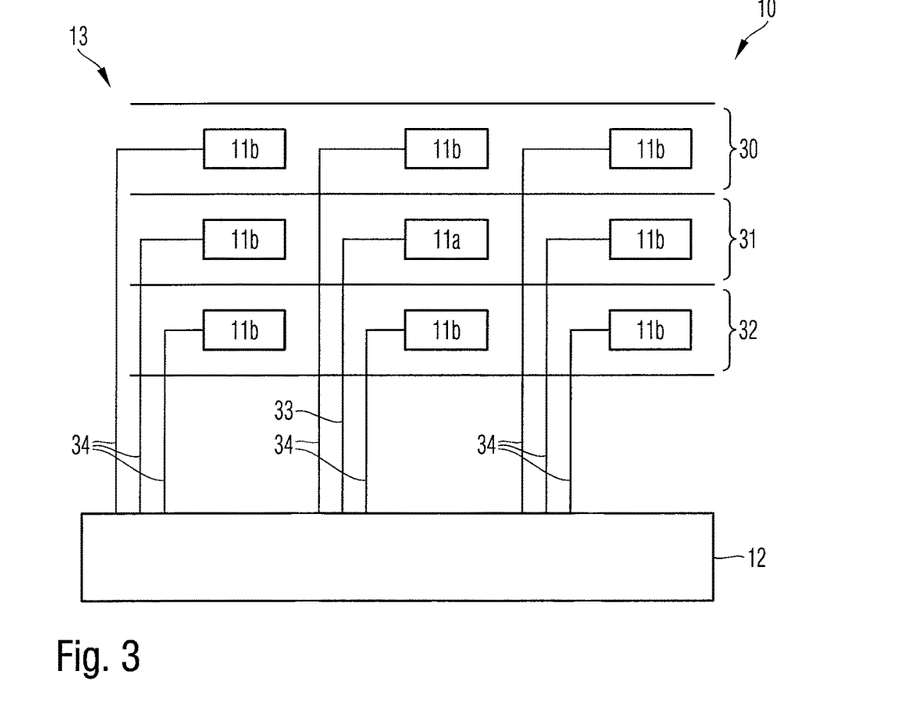
FIG. 3 shows a first test scenario.

Hereinafter, different test scenarios are described in more detail with regard to FIGS. 3-5:

In a first test scenario shown in FIG. 3, a plurality of vehicles 11a, 11b are arranged in different road lanes 30, 31, 32. One of the vehicles 11a comprises a transmit device 14 and is configured to transmit wireless test signals TX. This transmit device 14 may be in the form of a WLAN hotspot. However, it is also possible that the transmit device 14 is generating and transmitting any kind of continuous wave signal CW which may or may not comprise data.

This first vehicle 11a is typically (but not compulsory) placed in the center of all vehicles 11a, 11b. In the present case, the vehicle 11a is arranged in the second lane 31. The other second vehicles 11b are placed ideally (but not compulsory) in close proximity of and around the first vehicle 11a. each of the second vehicles 11b comprise a receive device 15 and is configured to transmit wireless test signals RX.

A multiport network analyzer 12 is connected via hardwired connections 33, 34 to the different transmit and receive devices 14, 15, respectively. The test environment 13 is in this case a stationary test environment in which the vehicles 11a, 11b are arranged in a fixed non-mobile configuration to each other.

In one embodiment, the multiport network analyzer 12 is a multiport vector network analyzer 12 which uses the different received test signals RX to calculate the path losses in the different communication links 16 between the transmit device 14 of the vehicle 11a and the corresponding receive devices 15 of the other vehicles 11b.

Figure 4:
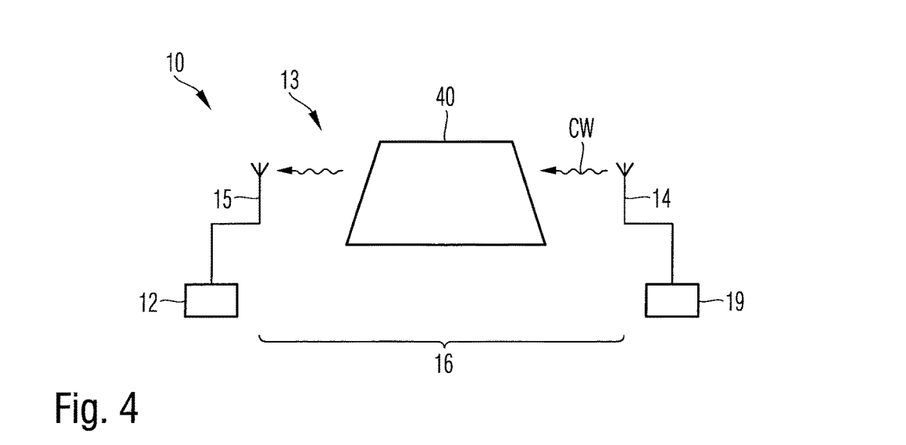
FIG. 4 shows a second test scenario.

In a second test scenario shown in FIG. 4, a signal generator 19—which in this case is not part of the network analyzer—12 is used to produce and transmit via a transmit antenna 14 the continuous wave test signals CW. A multiport network analyzer 12 is connected via hardwired or wireless connections to the transmit antenna 14 and receive antenna 15 for analysing the received test signals.

Instead of establishing a complete real world test scenario comprising a plurality vehicles, it is very often sufficient to arrange a kind of a car glass 40, such as a windscreen, a side or rear screen, in the area between the transmit antenna 14 and the receive antenna 15 in order to simulate the influence of this piece of car glass on the communication link 16.

Figure 5:
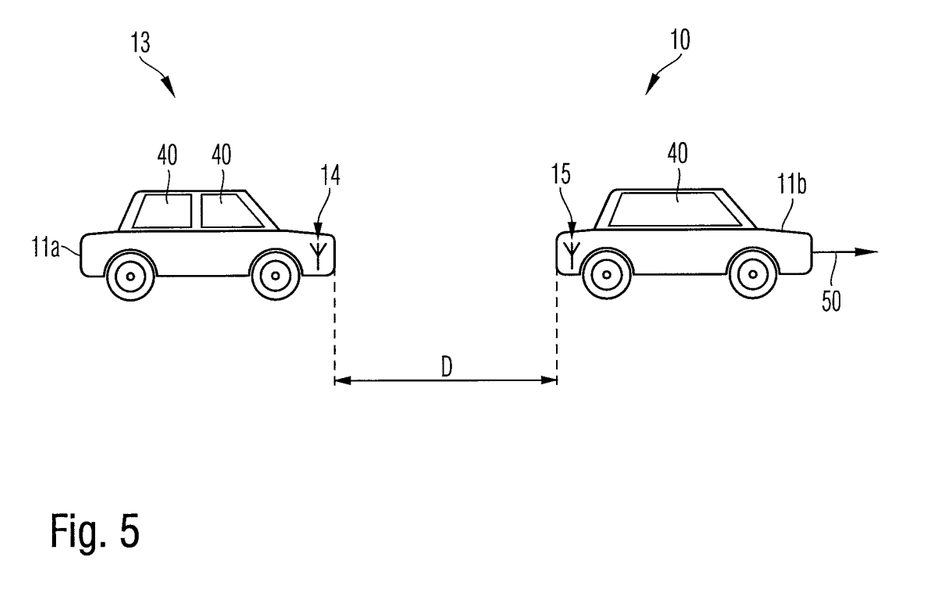
FIG. 5 shows a third test scenario.

In a third test scenario shown in FIG. 5, the first vehicle 11a is having a predefined distance D to the second vehicle 11b. The transmit antenna 14 is placed inside the car body of the first vehicle 11a and the transmit antenna 15 is placed inside the car body of the second vehicle 11b.

A multiport network analyzer 12 (not shown in FIG. 5) is connected via hardwired or wireless connections to the transmit antenna 14 and the receive antenna 15. In one embodiment, the multiport network analyzer 12 is used to calculate the path losses based on different predetermined properties of the car glass, such as the reflexion, transmission, absorption, etc. In another embodiment, the multiport network analyzer 12 is used to calculate the path losses based on different distances D between the vehicles 11a, 11b. In still another embodiment, the multiport network analyzer 12 is used to calculate the path losses based on different test signals (WLAN, continuous wave, varying frequencies, etc.). In still another embodiment, the mentioned test scenarios may also be mixed and combined with each other.

In the embodiment shown in FIG. 5, the test environment 13 may be a static test environment or a dynamic test environment. In a dynamic test, at least one of the vehicles 11a, 11b is moving preferably along a predetermined or arbitrary trajectory 50. In this case it is advantageous that the multiport analyzer device 12 employs wireless connections to the moving transmit and receive devices 14, 15 within the corresponding vehicles 11a, 11b.

Figure 6:
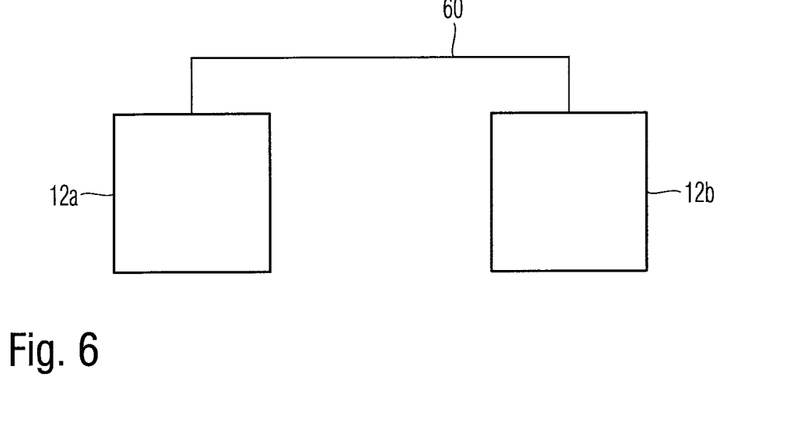
FIG. 6 shows an embodiment with two multiport analyzers.

In another embodiment shown in FIG. 6, two multiport analyzers 12a, 12b are provided. The two multiport analyzers 12a, 12b are connected and synchronized to each other via a backbone connection or network 60.

Figure 7:
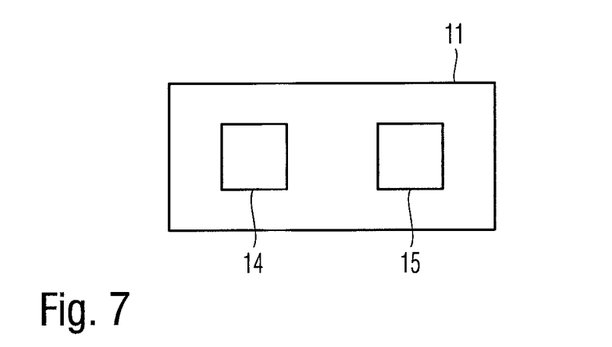
FIG. 7 shows an embodiment of a vehicle.

In another embodiment shown in FIG. 7, a vehicle 11 comprises as well a transmit antenna 14 and a receive antenna 15.

Figure 8:
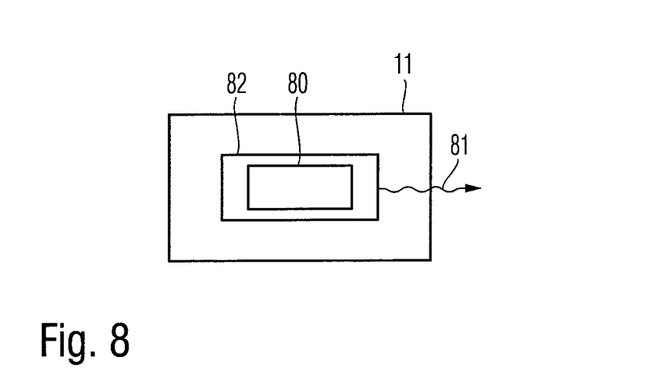
FIG. 8 shows another embodiment of a vehicle.

In another embodiment shown in FIG. 8, a vehicle 11 comprises a WLAN hotspot 80 for establishing a WLAN communication link 81 to at least one other WLAN capable vehicle. The WLAN hotspot 80 may be part of a WLAN capable infotainment system 82 arranged within this vehicle 11.

Figure 9:
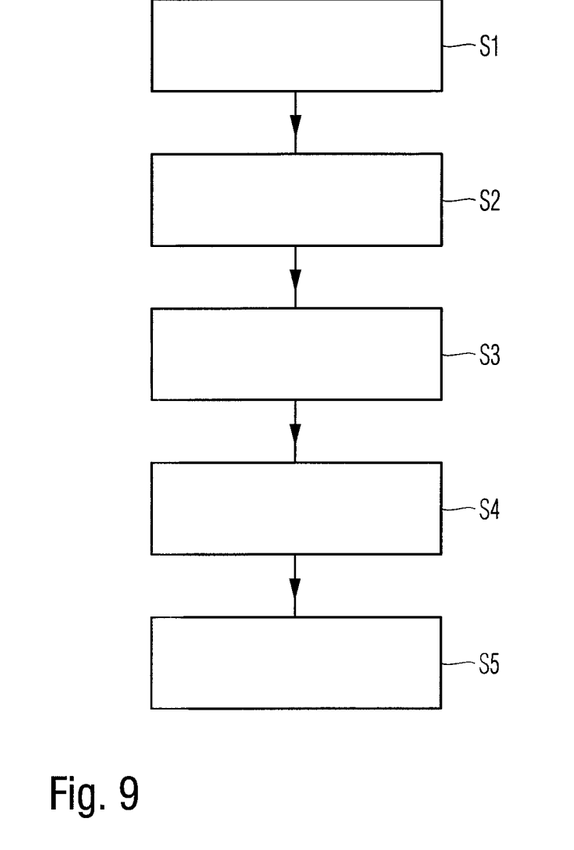
FIG. 9 shows a flow diagram for a test method according to another aspect of the present invention.

FIG. 9 shows a flow diagram for a test method according to another aspect of the present invention. The test method is used for measuring and analyzing interferences caused by wireless communication signals generated in vehicles. The test method comprises at least the following steps:

In a first step S1, a plurality of vehicles 11a, 11b, parts of vehicles 11a, 11b or simulations or reproductions thereof are provided and arranged in a test environment 13 in proximity to each other.

In a second step S2, a test signal TX is generated and provided via an output port 17 of the multiport analyzer 12 to a transmit device 14, such as a transmit antenna 14, of a first vehicle 11a.

In a third step S3, the test signal TX is transmitted via a wireless communication link 16 from a first vehicle 11a.

In a fourth step S4, the wirelessly transmitted test signal RX is received from at least one or more second vehicles 11b.

In a fifth step S5, the multiport analyzer 12 is measuring and analyzing the wireless communication link 16 under various test conditions based on the transmitted wireless test signal and the corresponding received test signals.

Although the present invention has been described above on the basis of preferred embodiments, it is not restricted thereto and instead can be modified in many different ways.

LIST OF REFERENCE NUMERALS 10 testing system
11, 11a, 11b vehicles, vehicle devices
12, 12a, 12b multiport analyzer
13 test environment
14 transmit device, transmit antenna
15 receive device, receive antenna
16 communication link
17 transmit port
18 receive port
19 signal generator
20 one lane road
21 three lane road
30, 31, 32 road lanes
33, 34 hardwired connections
40 car glass
50 trajectory
60 backbone network/connection
80 WLAN hotspot
81 WLAN communication link
82 infotainment system
D distance
R1, R2 radius
RX received test signals
TX transmitted test signals
S1-S5 method steps

The invention claimed is:

1. A testing system for measuring and analyzing interferences caused by wireless communication signals generated in vehicles, the system comprising:

a plurality of vehicle devices which are arranged in a test environment in proximity to each other, wherein at least one first vehicle device comprises a transmit device for transmitting wireless test signals;

wherein at least one second vehicle device comprises a receive device for receiving the transmitted test signals;

at least one multiport analyzer device for analyzing test signals, and wherein the analyzer device is connected to at least one of the transmit devices and to at least one of the receive devices;

wherein the analyzer device is arranged and configured such to analyze at least one wireless communication link between the at least one first vehicle device and the at least one second vehicle device under various test conditions based on the transmitted wireless test signals and the corresponding received test signals;

wherein the analyzes device is further configured to determine the path loss of at least one communication link by comparing the transmitted wireless test signals and the corresponding received test signals and thereby to determine the source of interference.

2. The system of claim 1, wherein the multiport analyzer device further comprises:

a signal generator for providing and transmitting predetermined wireless test signals to the transmit devices of the at least one first vehicle device and a multiport measurement device having a plurality of receive ports for measuring a plurality of received test signals.

3. The system of claim 1, wherein the multiport analyzer device is a multiport network analyzer or a multiport spectrum analyzer each having 16 receiving ports for connecting the multiport network analyzer and the multiport spectrum analyzer, respectively, to a corresponding number of 16 receive devices of the second vehicle devices.

4. The system of claim 1, wherein at least two multiport analyzer devices are provided which are connected and synchronized to each other via a backbone connection or network.

5. The system of claim 1, wherein the test environment is a stationary test environment in which the vehicle devices are arranged in a fixed configuration to each other.

6. The system of claim 5, wherein the connections between the multiport analyzer device and the corresponding vehicle devices are hardwired connections.

7. The system of claim 1, wherein the test environment is a dynamic test environment in which at least one of the vehicle devices is moving along a predetermined or arbitrary trajectory.

8. The system of claim 7, wherein at least one of the connections between the multiport analyzer device and the vehicle devices is a wireless connection.

9. The system of claim 1, wherein the vehicle device is a motor vehicle which is at least one of:
a car;
a truck;
a bus;
a motorcycle.

10. The system of claim 1, wherein the vehicle device is a simulation of a motor vehicle or part of it.

11. The system of claim 10, wherein the simulation of the motor vehicle is a car glass.

12. The system of claim 11, wherein the analyzer device is configured to test the absorption rate or the reflexion or the transmission of different types of car glasses.

13. The system of claim 1, wherein at least one vehicle device comprises as well a transmit device and a receive device.

14. The system of claim 1, wherein at least one of the transmit devices is arranged within a cabin of a corresponding vehicle device or at least within the corresponding vehicle device.

15. The system of claim 1, wherein at least one of the receive devices is arranged within a cabin of a corresponding vehicle device or at least within the corresponding vehicle device.

16. The system of claim 1, wherein the at least one vehicle device comprises a WLAN hotspot for establishing a WLAN communication link to at least one other vehicle devices and wherein the multiport analyzer device is configured to test and analyze the established WLAN communication link.

17. The system of claim 16, wherein the WLAN hotspot is part of a WLAN capable infotainment system arranged within the corresponding vehicle device.

18. The system of claim 1, wherein the multiport analyzer device is configured to test and analyze a communication link for a vehicle-to-vehicle communication according to the IEEE 802.11p standard.

19. A test method for measuring and analyzing interferences caused by wireless communication signals generated in vehicles, the method comprising:

providing a plurality of vehicle devices which are arranged in a test environment in proximity to each other;

providing a test signal;

transmitting the test signal via a wireless communication link from a first vehicle device;

receiving the wirelessly transmitted test signal from at least one second vehicle device;

analyzing the wireless communication link under various test conditions based on the transmitted wireless test signal and the corresponding received test signals; and determining the path loss of the at least one communication link by comparing the transmitted wireless test signals and the corresponding received test signals;

determine the source of interference.

* * * * *